(12) United States Patent
Eggert et al.

(10) Patent No.: US 10,987,745 B2
(45) Date of Patent: Apr. 27, 2021

(54) METHOD OF MANUFACTURING SOCKET PUNCHES

(71) Applicant: Snap-on Incorporated, Kenosha, WI (US)

(72) Inventors: Daniel M. Eggert, Kenosha, WI (US); Steven R. Wente, Kenosha, WI (US); David G. McGreal, Twin Lakes, WI (US); Jeffrey M. Arendt, Union Grove, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 16/258,032

(22) Filed: Jan. 25, 2019

(65) Prior Publication Data

US 2020/0238412 A1 Jul. 30, 2020

(51) Int. Cl.
| | | |
|---|---|---|
| *B23H 5/04* | (2006.01) | |
| *B23K 5/16* | (2006.01) | |
| *B21D 37/01* | (2006.01) | |
| *B23H 9/12* | (2006.01) | |
| *B21K 5/16* | (2006.01) | |
| *B21D 28/34* | (2006.01) | |

(52) U.S. Cl.
CPC .............. *B23H 5/04* (2013.01); *B21D 37/01* (2013.01); *B21K 5/16* (2013.01); *B23H 9/12* (2013.01); *B21D 28/34* (2013.01)

(58) Field of Classification Search
CPC .............. B26F 1/14; B21K 1/463; B21K 5/16
USPC .......................................................... 83/686
See application file for complete search history.

(56) References Cited

U.S. PATENT DOCUMENTS

| | | | | |
|---|---|---|---|---|
| 1,430,004 A | * | 9/1922 | Carlson ............... | B21K 5/16 76/114 |
| 1,569,136 A | * | 1/1926 | Pardee, Jr. ........... | B21D 28/34 83/687 |
| 1,595,588 A | * | 8/1926 | Tuttle .................. | B21K 5/16 72/338 |
| 1,771,610 A | * | 7/1930 | Blakeslee ............ | B21K 5/16 76/9 |

(Continued)

FOREIGN PATENT DOCUMENTS

| | | |
|---|---|---|
| CN | 103252409 | 8/2013 |
| CN | 103419163 | 12/2013 |

(Continued)

OTHER PUBLICATIONS

EDM vs. Milling in Die/Mold machining, by Peter Zelinski, year 2000 (Year: 2000).*

(Continued)

*Primary Examiner* — Kenneth E Peterson
(74) *Attorney, Agent, or Firm* — Seyfarth Shaw LLP

(57) ABSTRACT

A method of manufacturing a punch, such as a socket punch, using wire EDM with at least six steps. The method involves forming a blank, holding the blank with an adapter, machining grooves in the blank, manufacturing a side relief of a working portion using wire EDM, milling the working portion to a final size, and forming a cone point on the end of the working portion. The method allows the punch to be manufactured more quickly and from a CAD model, therefore removing the need for over-specialized equipment and improving manufacturing times.

19 Claims, 7 Drawing Sheets

(56) References Cited

U.S. PATENT DOCUMENTS

| | | | | |
|---|---|---|---|---|
| 1,772,723 A * | 8/1930 | Klein | | B21K 5/16 76/114 |
| 1,978,372 A * | 10/1934 | Purtell | | B21K 1/463 470/8 |
| 2,027,922 A * | 1/1936 | McNaught | | B21K 5/16 72/325 |
| 2,584,415 A * | 2/1952 | Wilbur Barnett | | B21D 28/34 83/133 |
| 2,621,344 A * | 12/1952 | Friedman | | B21K 1/463 470/14 |
| 2,756,876 A * | 7/1956 | Elden | | B21K 1/18 72/267 |
| 2,847,069 A * | 8/1958 | Kopczynski | | B21D 28/34 83/686 |
| 3,768,343 A * | 10/1973 | Hawkins | | B23P 15/16 76/107.6 |
| 3,798,727 A * | 3/1974 | Brock | | F15C 5/00 29/890.09 |
| 4,152,570 A | 5/1979 | Inoue et al. | | |
| 4,250,371 A | 2/1981 | Haug et al. | | |
| 4,345,492 A * | 8/1982 | Spengler | | B23P 15/40 76/101.1 |
| 4,526,077 A * | 7/1985 | DeGuvera | | B21D 28/34 83/686 |
| 4,547,646 A | 10/1985 | Briffod | | |
| 4,725,704 A | 2/1988 | Vuichard | | |
| 5,214,260 A | 5/1993 | Fricke | | |
| 5,836,226 A | 11/1998 | Tsuji et al. | | |
| 5,943,934 A * | 8/1999 | Codatto | | B21D 28/34 83/140 |
| 5,960,681 A * | 10/1999 | Anderson | | B21K 5/16 81/121.1 |
| 5,992,280 A * | 11/1999 | Oishi | | B21D 28/14 72/334 |
| 6,998,561 B2 | 2/2006 | Kato et al. | | |
| 7,712,396 B2 * | 5/2010 | Holmquist | | B23P 15/246 219/121.67 |
| 8,087,333 B2 * | 1/2012 | Oishi | | B21D 28/26 83/138 |
| 8,242,403 B2 | 8/2012 | Angeleno et al. | | |
| 8,281,693 B2 * | 10/2012 | Shih | | B25B 15/008 29/557 |
| 8,584,561 B2 | 11/2013 | Sugiyama et al. | | |
| 9,193,020 B2 | 11/2015 | Baumeler | | |
| 9,447,491 B2 * | 9/2016 | Ahlgren | | B23C 5/006 |
| 9,630,232 B2 | 4/2017 | Ishikawa et al. | | |
| 2002/0129677 A1 | 9/2002 | Tsuji et al. | | |
| 2003/0075034 A1 | 4/2003 | Brenneke | | |
| 2008/0201010 A1 | 8/2008 | Takagi et al. | | |
| 2013/0169195 A1 * | 7/2013 | Deyhim | | G21K 1/02 318/3 |
| 2014/0060268 A1 | 3/2014 | Goss | | |
| 2018/0106286 A1 | 4/2018 | Cone | | |
| 2020/0078854 A1 * | 3/2020 | Chen | | B21K 5/16 |

FOREIGN PATENT DOCUMENTS

| | | |
|---|---|---|
| CN | 207770942 U | 8/2018 |
| CN | 106563858 B | 9/2018 |
| EP | 3415249 | 12/2018 |
| JP | 55-058921 | 5/1980 |
| JP | 55-120929 | 9/1980 |
| JP | 57-211422 * | 12/1982 |
| JP | 61-214923 | 9/1986 |
| JP | S6254625 A | 3/1987 |
| JP | H04304957 A | 10/1992 |
| JP | H0788721 A | 4/1995 |
| JP | 7-256519 A | 10/1995 |
| KR | 20120052720 | 5/2012 |
| TW | 201309431 A | 3/2013 |

OTHER PUBLICATIONS

Combined Search and Examination Report for Application No. GB1910891.9 dated Jan. 14, 2020, 5 pages.
Taiwan Office Action for Application No. 10920149950 dated Feb. 19, 2020, 8 pages.
Taiwan Second Office Action for Application No. 108135047 dated Aug. 24, 2020, 10 pages.
CPM REX T15(HS) publication, <URL:https://www.crucible.com/eselector/prodbyapp/tooldie/cpmt15T.html>, published on Nov. 21, 2018 (per Wayback machine).
Examination Report No. 1 for Application No. 2019208264 dated May 13, 2020, 8 pages.
Combined Search and Examination Report for Application No. GB2008163.4 dated Nov. 25, 2020, 9 pages.
Examination Report for Application No. 2019208264 dated Dec. 16, 2020, 7 pages.
Wirtz, H et al., 'To Mill or to EDM—That is the Question' [retrieved from internet Dec. 16, 2020]. <URL: https://www.moldmakingtechnology.com/articles/to-mill-or-to-edm-that-is-the-question>published Mar. 23, 2017 as per wayback machine.
GF AgieCharmilles, Results Today [retrieved from internet Dec. 16, 2020]. <URL: https://www.gfms.com/content/dam/gfac/PDF-Documents/Results-Today/GFAC_Results_today_03_EN.pdf>published on Jun. 17, 2017 as per wayback machine.

* cited by examiner

METHOD OF MANUFACTURING SOCKET PUNCHES

TECHNICAL FIELD OF THE INVENTION

The present invention relates generally to manufacturing methods. More particularly, the present invention relates to methods of manufacturing socket punches using electrical discharge machining.

BACKGROUND OF THE INVENTION

Punches are tools used to force a hole into a material, such as a work piece. Typically, the punch is operated in a "cold work" manner to punch a hole without the use of additional heat, as with hot extrusion or other "hot work" operations. Punches are forced or "punched" into the work piece, reforming the material to the shape of the punch.

Punches are manufactured in a variety of ways, but are normally formed by grinding a punch blank to a desired geometric configuration. However, grinding requires specialized grinding equipment, extended time to manufacture the punch, and additional quality control procedures to ensure that the finish punch product meets required specifications.

SUMMARY OF THE INVENTION

The present invention broadly comprises a method of manufacturing a punch, such as a socket punch, using wire electrical discharge machining ("wire EDM"). In an embodiment, the process includes the steps of: (1) forming a blank; (2) holding the blank with an adapter; (3) manufacturing grooves into the working portion of the blank using wire EDM techniques; (4) manufacturing a side relief of the working portion using wire EDM techniques; (5) milling the working portion to a final shape and size; and (6) machining a cone point onto an end of the working portion. The present invention allows the punch to be manufactured by "burning" the punch geometry with the wire based on a computer-aided design ("CAD") model, thereby removing the need for over-specialized equipment, such as grinding equipment, and improving manufacturing times and quality and consistency.

The present invention also broadly comprises a method of manufacturing a punch including forming a blank, machining a geometry of the blank with an EDM machine, milling a desired geometry of the blank to obtain a final geometric size and configuration on a portion, and machining a cone point on an end of the portion to form the punch.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
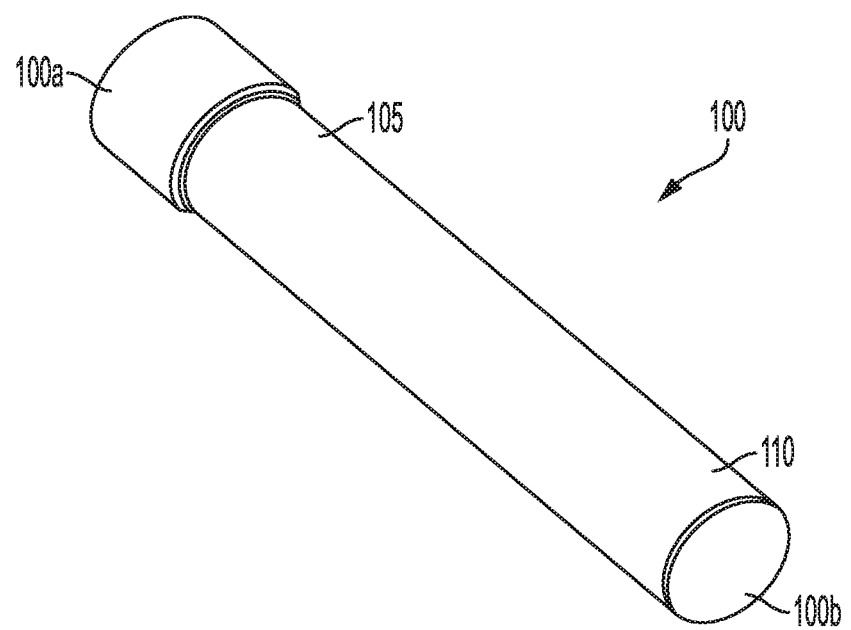
FIG. 1 is a side perspective view of a punch blank according to an embodiment of the present invention.

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a method of manufacturing a punch, such as a socket punch, using wire EDM. In an embodiment, a blank is formed; the blank is held with an adapter; grooves are machined in the working portion using wire EDM; the side relief of the working portion is manufactured using wire EDM; the working portion is milled to a final size; and a cone point is formed on the end of the working portion. The above process allows the punch to be manufactured more quickly and from a CAD model, therefore removing the need for over-specialized equipment and improving manufacturing times.

Referring to FIG. 1, in an embodiment, a blank 100 includes a first end 100a and an opposing second end 100b. The blank 100 can include a base portion 105 that acts as a structural backbone of the blank 100, and a working portion 110 intended to perform the punching operation when complete and in use. The blank 100 can be any material, but in an embodiment, is made of Crucible Particle Metallurgy ("CPM") T-15 steel. As discussed below with respect to FIG. 7, the manufacturing process includes forming a blank, such as the blank 100 shown in FIG. 1.

Figure 2:
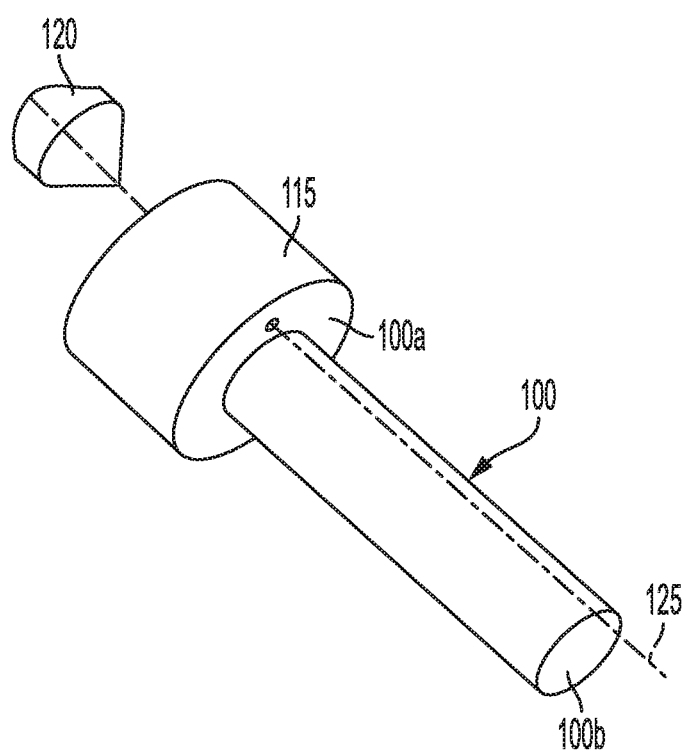
FIG. 2 is a side perspective view of an EDM machine manufacturing a blank held by an adapter according to an embodiment of the present invention.

Referring to FIG. 2, a side perspective view of an adapter 115 holding a blank 100, and an EDM machine 120 manufacturing a blank 100 held by the adapter 115, according to an embodiment of the present invention, is shown. As shown, the EDM machine 120 can include a wire 125 that performs the machining/manufacturing operation of the EDM machine 120. The wire 125 can have an approximately 0.010" diameter, although the present invention is not so limited.

Figure 3:
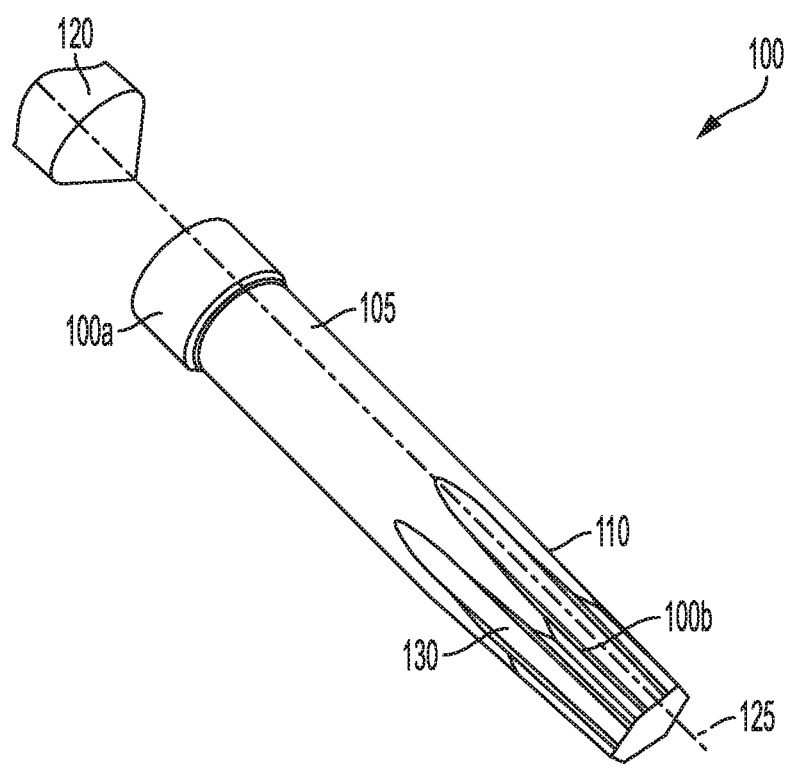
FIG. 3 is a side perspective view of an EDM machine manufacturing grooves into a blank according to an embodiment of the present invention.

Referring to FIG. 3, a side perspective view of an EDM machine 120 manufacturing grooves 130 into a blank 100 according to an embodiment is shown. As shown, the wire 125 can be located at an angle with respect to the axis of the blank 100. For example, and without limitation, the wire 125 can be angled between 1.25 degrees to 2.00 degrees to avoid cutting the base portion 105 during the machining operation. By angling the wire 125, the punch, when completed, can be more easily pulled out of a socket in a cold forming process.

Figure 4:
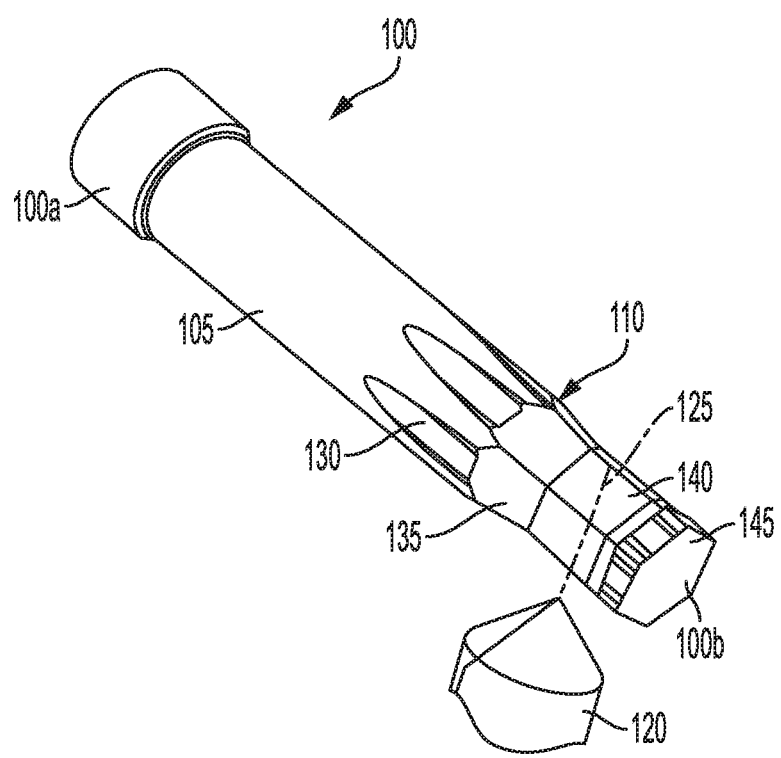
FIG. 4 is a side perspective view of an EDM machine manufacturing a relief of the working portion according to an embodiment of the present invention.
Figure 5:
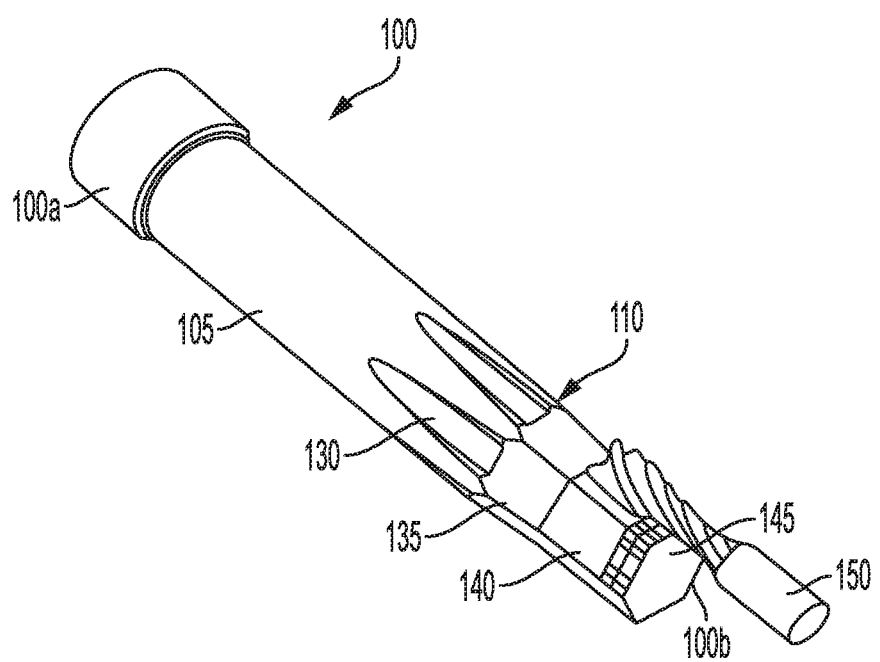
FIG. 5 is a side perspective view of a milling machine milling the working portion to a final hex size according to an embodiment of the present invention.
Figure 6:
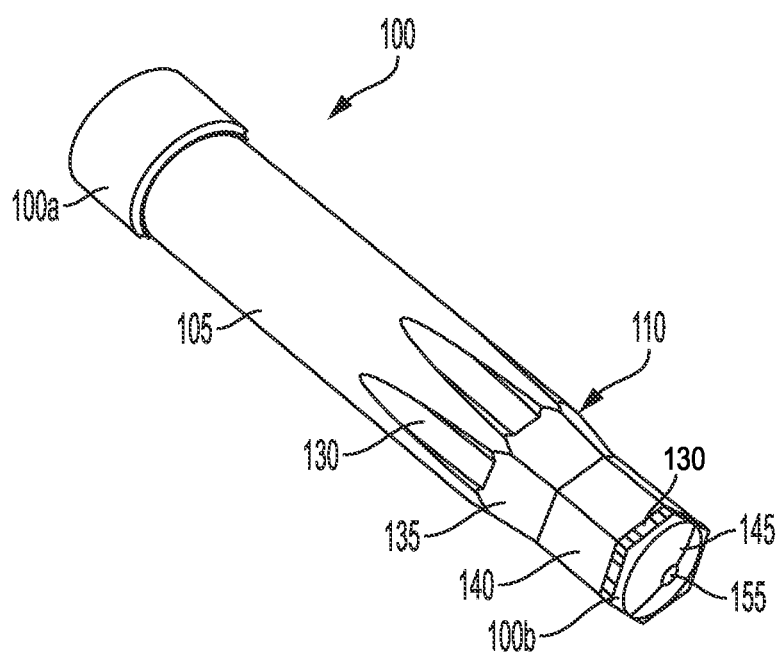
FIG. 6 is a side perspective view of a completed punch with a cone point machined on the end of the working portion according to an embodiment of the present invention.

Referring to FIG. 4, a side perspective view of an EDM machine 120 manufacturing a relief of the working portion 110 according to an embodiment is shown. For example, the EDM machine 120 can manufacture a transition portion 135 leading to a hex portion 140 using wire EDM techniques. The hex portion 140 can extend from an end of the transition portion 135 to a hex end portion 145. As shown in FIG. 5, the working portion 110, and specifically the hex portion 140 in some embodiments, can be milled by a milling machine 150 to a final hex size of the working portion 110/hex portion 140. As shown in FIG. 6, a cone point 155 can then be machined into the hex end portion 145 of the blank 100 to complete the machining portion of the process.

Figure 7:
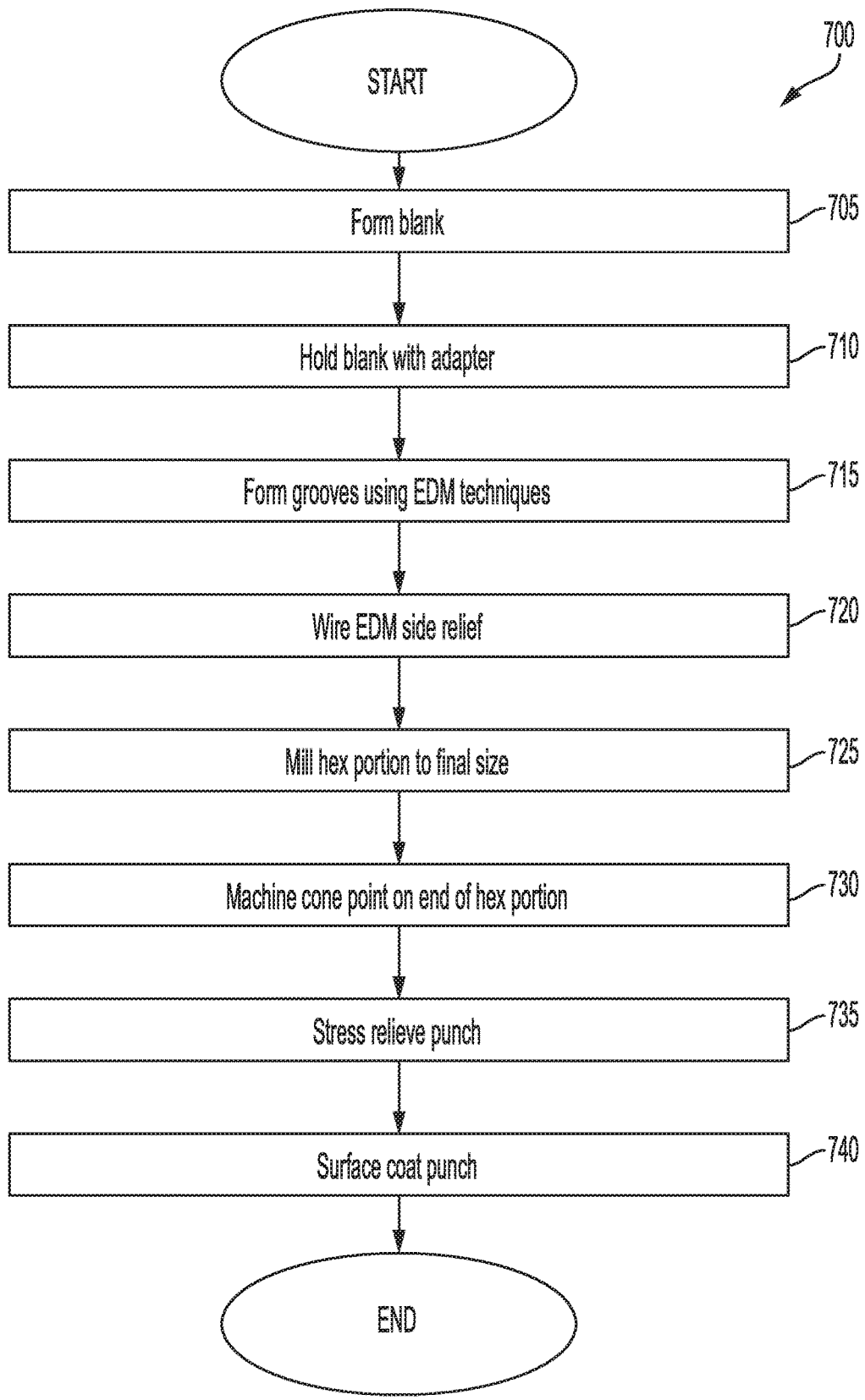
FIG. 7 is a flow chart outlining a method of manufacturing a punch according to an embodiment of the present invention.

FIG. 7 illustrates a method of manufacturing a punch 700 according to an embodiment. As shown, the method 700 begins and proceeds to step 705 where a blank is formed, as shown in FIG. 1. The method 700 then proceeds to step 710 where the blank 100 is held by an adapter 115, as shown in FIG. 2. Step 715 then follows, where grooves 130 can be formed in the blank 100 on the working end 110, as shown in FIG. 3. The method 700 then proceeds to step 720, where the side relief of the working end 110 is machined. It is in this step where the where the transition portion 135 and the hex portion 140 can be machined into the blank using EDM techniques, as shown in FIG. 4. The method 700 can then proceed to step 725, where the hex portion 140 is milled to its final size as shown in FIG. 5, and then to step 730, where the cone point 155 is machined into the hex end portion 145.

The method 700 can then proceed to step 735, where the punch is stress relieved. For example, the punch can be stress relieved at 1025° F. for two hours. The method 700 can then proceed to step 740, where the punch is surface coated. For example, the punch can be coated with aluminum chromium nitride or titanium nitride.

The above steps in FIG. 7 and elsewhere in the specification are recited in a certain chronological order, but such an order is not necessarily required to effect the present invention unless expressly stated in the claims below. Further, certain steps may be omitted from the method 700 and unless expressly recited in the claims below, are optional.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method of manufacturing a punch from a blank having first and second halves, wherein the second half has a second end, the method comprising:
    holding the blank;
    forming grooves in the second half with an electric discharge machine ("EDM"), wherein the grooves have respective groove profiles and extend to the second end;
    forming a hex portion with the EDM machine in the blank in a portion of the second half, wherein respective groove portions and groove remnants of the groove profiles remain after forming the hex portion with the EDM machine, and wherein the groove portions are disposed between the hex portion and the first half, and the groove remnants are disposed adjacent to the second end;
    milling the hex portion to obtain a final hex portion size; and
    machining a cone point at the second end.

2. The method according to claim 1, further comprising forming a transition portion between the groove portions and the hex portion.

3. The method according to claim 1, wherein the EDM machine includes a wire having a diameter of 0.010 inches.

4. The method according to claim 1, wherein the blank includes a Crucible Particle Metallurgy ("CPM") T-15 steel material.

5. The method according to claim 1, wherein the EDM machine includes a wire and wherein the step of forming grooves includes angling the wire at 1.25-2.00 degrees relative to an axis of the blank.

6. The method according to claim 1, further comprising stress relieving the punch.

7. The method according to claim 6, wherein the step of stress relieving the punch includes heating the punch to 1025° F. for two hours.

8. The method according to claim 1, further comprising surface coating the punch.

9. The method according to claim 8, wherein the step of surface coating the punch includes coating the punch with aluminum chromium nitride.

10. The method according to claim 8, wherein the step of surface coating the punch includes coating the punch with titanium nitride.

11. A method of manufacturing a punch comprising:
    forming a blank having first and second halves, wherein the second half has a second end;
    machining a geometry of the blank with an EDM machine and forming grooves having respective groove profiles in the second half and that extend to the second end;
    milling a hex portion in the blank in a portion of the second half to obtain a final hex portion size, wherein respective groove portions and groove remnants of the groove profiles remain after milling the hex portion, the groove portions are disposed between the hex portion and the first half, and the groove remnants are disposed adjacent to the second end; and
    machining a cone point at the second end.

12. The method according to claim 11, wherein the EDM machine includes a wire and wherein the step of forming the grooves includes angling the wire at an angle of 1.25-2.00 degrees to the axis of the blank.

13. The method according to claim 11, wherein the step of machining a geometry of the blank includes forming the hex portion with the EDM machine.

14. The method according to claim 11, further comprising holding the blank with an adapter.

15. The method according to claim 11, wherein the step of machining a geometry of the blank includes forming a transition portion between the groove portions and the hex portion.

16. The method according to claim 11, further comprising stress relieving the punch.

17. The method according to claim 16, wherein the step of stress relieving the punch includes heating the punch to 1025° F. for two hours.

18. The method according to claim 11, further comprising surface coating the punch.

19. The method according to claim 18, wherein the step of surface coating the punch includes coating the punch with one of aluminum chromium nitride and titanium nitride.

* * * * *